United States Patent [19]

Fausto

[11] Patent Number: 5,128,572
[45] Date of Patent: Jul. 7, 1992

[54] BRUSHLESS ELECTRIC MOTOR

[75] Inventor: Guastadini Fausto, Cocconato, Italy

[73] Assignee: Electro-Parts S.p.A., Bossolasco, Italy

[21] Appl. No.: 521,098

[22] Filed: May 3, 1990

Related U.S. Application Data

[63] Continuation of Ser. No. 226,949, Aug. 1, 1988, abandoned.

[30] Foreign Application Priority Data

Jul. 31, 1987 [IT] Italy ............... 67667 A/87

[51] Int. Cl.⁵ .................. H02P 6/02; H02K 21/14
[52] U.S. Cl. .................................. 310/68 R
[58] Field of Search ............. 310/67 R, 68 R, 68 B, 310/156; 318/138, 254

[56] References Cited

U.S. PATENT DOCUMENTS

| | | |
|---|---|---|
| 3,230,434 | 1/1966 | Bauerlein . |
| 3,806,785 | 4/1974 | De Valroger et al. . |
| 3,845,334 | 10/1974 | Harada et al. . |
| 4,093,905 | 6/1978 | von Braun ............... 318/696 |
| 4,246,518 | 1/1981 | Kögler et al. ............ 318/138 |
| 4,678,974 | 7/1987 | Guastadini ............... 318/254 |
| 4,724,368 | 2/1988 | Andrews .................. 310/68 R |
| 4,804,873 | 2/1989 | Shiraki et al. ............ 310/67 R |

FOREIGN PATENT DOCUMENTS 390371 8/1965 Switzerland .
1117329 6/1968 United Kingdom .

Primary Examiner—Steven L. Stephan
Assistant Examiner—D. L. Rebsch
Attorney, Agent, or Firm—Young & Thompson

[57] ABSTRACT

The pulsating current brushless electric motor includes a permanent magnet rotor rotating in a stator and having numerous circumferentially adjacent polarities in corresponding opposition. The stator contains slots positioned at a uniform reciprocal distance from the pertaining field windings. The rotor performs a keyed rotation on a particular shaft which includes known optical, magnetic or similar devices for the operational detection of its angular position, in combination with electronic circuits which are preset to the distribution of the electric current in the windings.

5 Claims, 3 Drawing Sheets

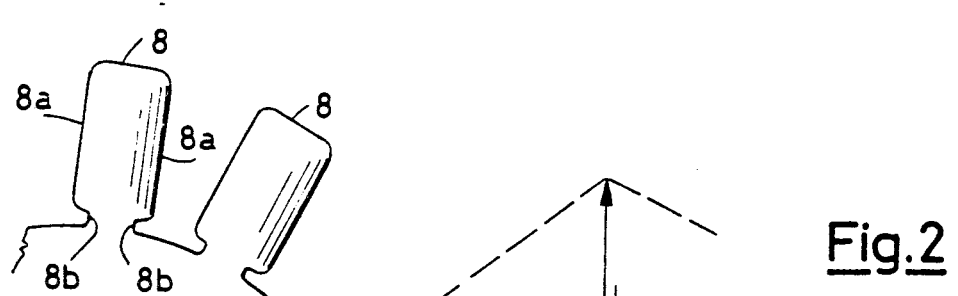
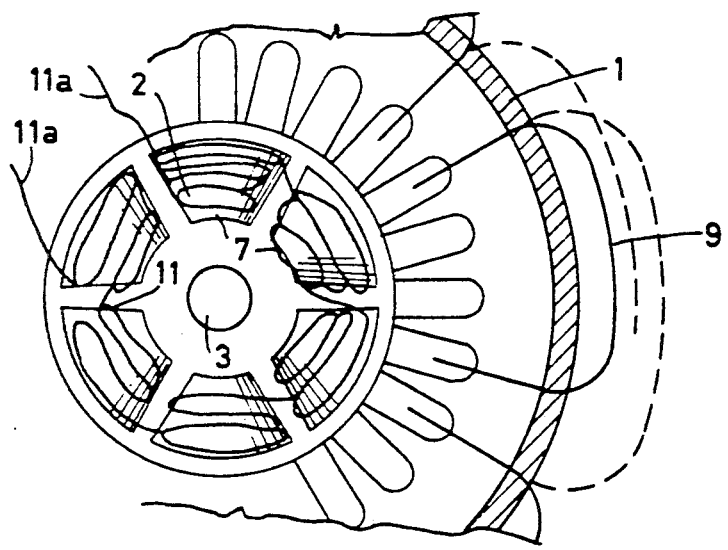

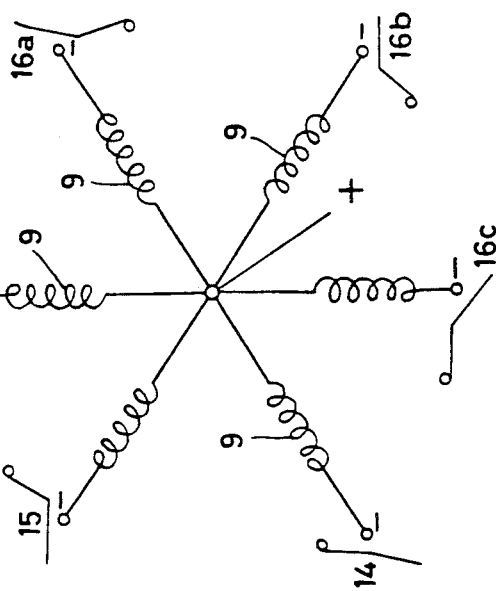
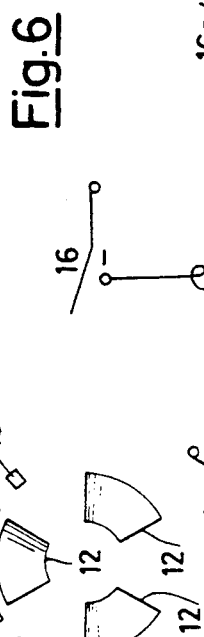
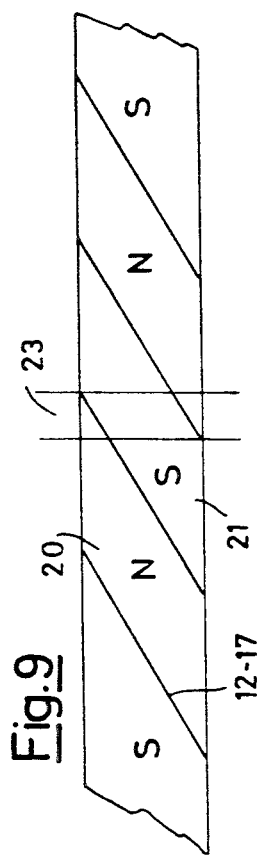
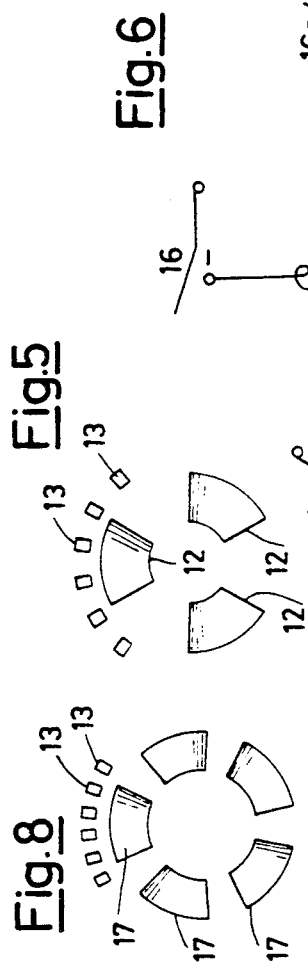
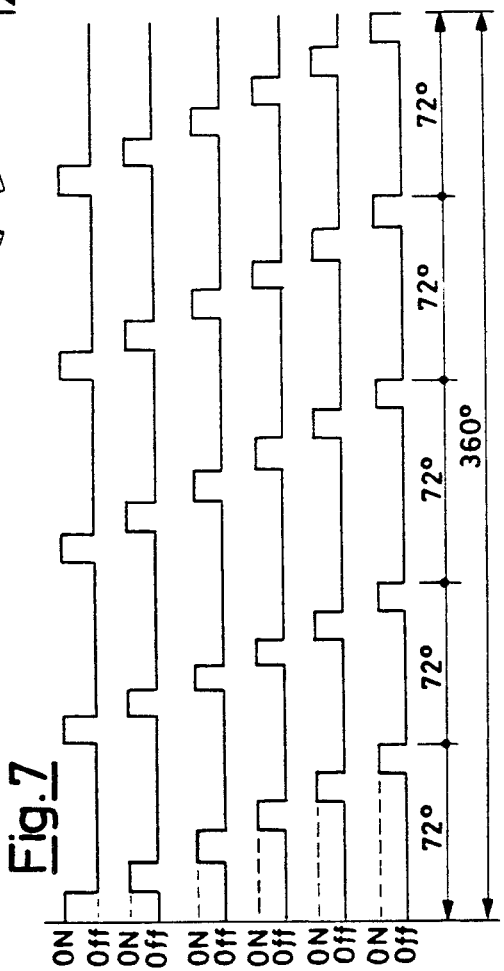
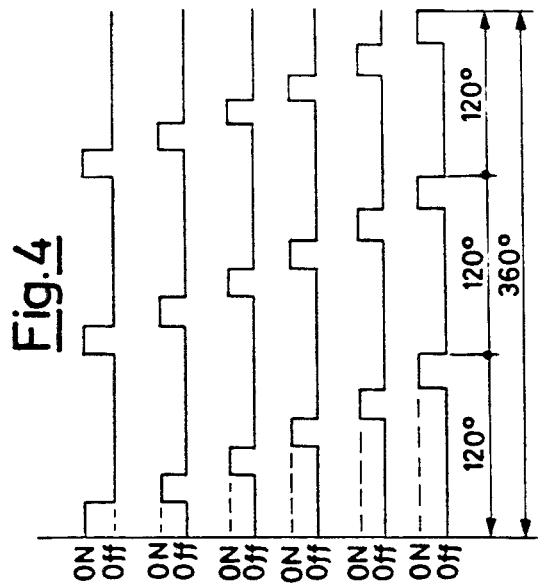

5,128,572

BRUSHLESS ELECTRIC MOTOR

This application is a continuation of application Ser. No. 226,949, filed Aug. 1, 1988, now abandoned.

BACKGROUND OF THE INVENTION

This invention relates to a pulsating current brushless electric motor and specifically to positive improvements relating to its operation.

As already known, in this type of electric motor the commutator with brushes is replaced by a set of coils located on a normal rotor pole or a diametrically disposed pair of poles, so as to allow operating rotation in the absence of commutation.

The purpose of the invention is to improve the operation of the motor by increasing the number of magnetic poles that provide the best possible intense flux and also determine a high number of magnetic face inputs and by opportunely reducing the angle value of the pulsating channels. The switches relating to these channels have an on/off simultaneous and rapid operation and are adjusted by a known advance device according to the required motor speed.

Another purpose of the invention is to obtain an increase in the efficiency of the motor and an increase in power of permanent magnets and electromagnets which are contained in a compact, light structure.

The above solution offers the advantages of the availability of the materials for construction, and rapidity of manufacturing and assembly. The electric motor thus manufactured will be highly reliable and efficient and will not require particular maintenance. Thus, idle times are avoided resulting in an economical advantage.

SUMMARY OF THE INVENTION

To reach all of the above purposes, and others that will emerge from the detailed description which follows, a range of improvements to the pulsating current brushless electric motor are realized. Its main characteristic is that it includes a rotor in keyed rotation revolving on a shaft and a set of magnetic poles--circumferentially adjacent and having opposed polarity therebetween--for the purpose of determining a certain number of magnetic face inputs. Furthermore they present a functional facing into a cylindrical stator element which is equipped with reciprocally equidistant slots obtained at angular distances. These slots are able to receive certain windings which operate as electrical channels. Finally, electronic means with or without position detectors and electronically compared synchronized impulses provide the operating verification of the positional angularity of the rotor as regards power distribution and electric feeding.

BRIEF DESCRIPTION OF THE FIGURES

A description of the practical solution follows and reference must be made to the enclosed drawings, in which:

FIG. 2 is a transverse sectional view taken along line II—II of FIG. 1 with a relating detail in oversize scale of one of its slots;

FIG. 3 is a partial section view similar to the one in FIG. 2, but which illustrates a manufacturing and employment variation of the rotor of the motor;

FIG. 4 schematically shows the sequence of the electric current signals of impulses to the motor;

FIG. 5 is a detailed front view of the relating comparator;

FIG. 6 is a wiring diagram of the winding;

FIGS. 7-8 relate to similar to FIGS. 4 and 5, but are an increased number of poles of the motor;

FIG. 9 schematically shows the comparator operation.

DETAILED DESCRIPTION

Figure 1:
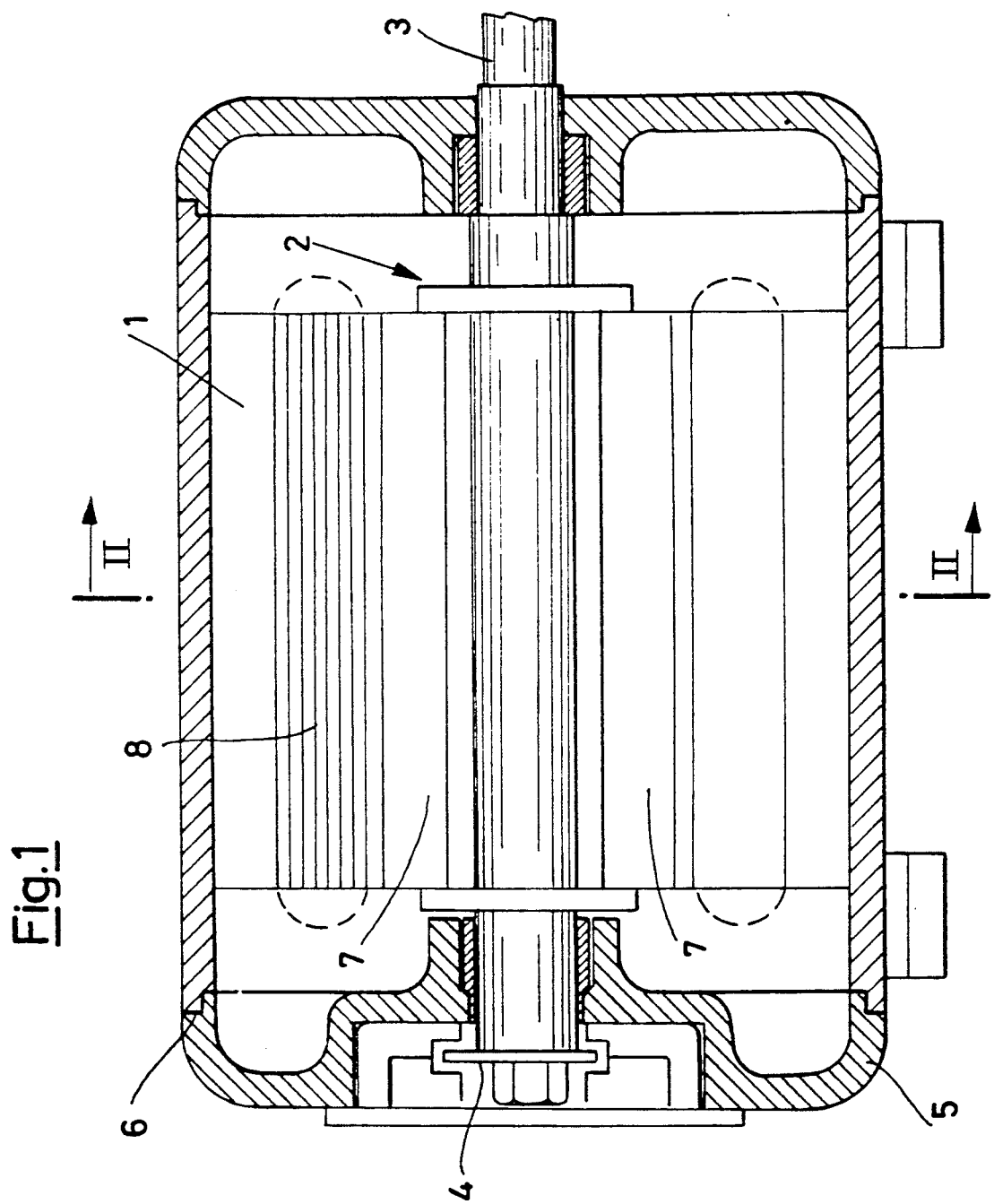
FIG. 1 is a longitudinal section view of the electric motor according to the invention.

With reference to the above-mentioned figures, the elements of the components that constitute the invention are described together with their operation. The electrical portion and the systems for the detection of the angular position of the keying and driving shaft, the distribution and direct current feeding are not taken into consideration as these are already well known to those of ordinary skill in the art. Reference numeral 1 indicates the hollow cylindrical stator made of ferrous material, and in it is assembled the permanent magnet or electromagnet rotor 2 which, in turn, is keyed on the shaft 3 concentrically holding at one of its ends the bars 4. The bars are traditionally placed with eccentric orientation, so as to cross alternately a common light beam, the optical transmission of which is detected by a pertinent receiver. The shaft and lobes are assembled on the stator body cover 5 and are retained on it by means of circumferential stepped flange 6 (see FIGS. 1 and 2).

As an electric motor having a rotor equipped with a minimum of four poles is foreseen, as a first characteristic embodiment, the case of six poles 7 is considered and graphically illustrated. The positions of the poles 7 are determined by the fact of being circularly adjacent with the alternating polarities north and south being indicated by "N" and "S".

In the interior of the stator, in the sector adjacent to the air gap and externally with respect to the poles 7, slots 8 are provided—24, for example—for the containment of conductors or windings 9 which constitute the stator circuit. The pertinent connection is indicated at 10. Each slot 8 is formed by two parallel radial sides 8a that are tapered to a V-shaped bottom 8b in the opening thereof, in order to constitute a valid slot for the same winding 9 as shown in detail in FIG. 2.

FIG. 3 shows a second embodiment of the rotor to be applied for high power. The structure of the stator and of its windings are as set forth above.

The rotor of FIG. 3 is of the electromagnetic type and in each of its poles 7 has inductor windings 11 with connections of traditional type for the respective protruding ends 11a.

FIG. 4 graphically illustrates the diagram of impulses or signals in sequence of the electric motor increased to six channels for the six-pole rotor. Each of these have a value of 20° as regards operation and angle, thus making 120° which, repeated three times gives the total 360° of the circumference angle. Thus, the electrical control means are operated such that the windings are successively switched "on" over an operating angle equal to 360° divided by half the number of poles, further divided by the number of windings.

FIG. 5 schematically illustrates the three-lobe comparator 12, on the top of which sensors 13 or rotor position detectors are located. FIG. 6 indicates the operating succession of the switches on winding 9 showing the simultaneous "off" position of the switch 14 and the "on" position of the corresponding other switches 15, 16, 16a, 16b, 16c, respectively, and inverse operation deriving from an advance according to the required motor speed realized by mechanical or electrical means.

The wiring diagram of the impulses or signals illustrated in FIG. 7 is horizontally increased with respect to the previous one of FIG. 4, as in this case it concerns a ten-pole six channel rotor. Each of these have an angle of operation of 12°, thus making 72° which, repeated five times, gives a total value of 360°. FIG. 8 illustrates the relating comparator having five lobes 17 and the sensors 13 set forth above.

This invention offers a guarantee of a prompt and uniform rotation of the rotor 2, due to the "on-off" sequence of the current and owing to the type of windings 9 and to how the feeding takes place. The high number of face inputs is also evidenced, due to the large number of poles 7, particularly at the end surfaces 7a, 7b, 7c, etc. This was not the case when there were only a couple of poles, as only two inputs were in operation, in opposition between them with respect to the 180° reference.

Furthermore, FIG. 9 schematically illustrates how the comparators or detectors 12, 17 of signal superimposition by influencing the electronic detection means and reaching a certain number of channels (not defined phases) may usefully surpass the 360° angle.

In FIG. 9, the same comparators 12 and 17, at reference 23 are shown superimposed because of the surmounting of the channels over 360°; reference 20 and 21 show the respective polarities "north" and "south".

Furthermore, the invention offers a considerable savings in electricity since after the initial static torque—common to traditional motors—a reduced intervention in the number of channels is derived, without reducing the speed.

The linearity of the pulsating current input must also be evidenced owing to the rotation uniformity of the electric motor contained in a compact, light and small-dimensioned structure. It also develops that, among the respective channels, no potential difference is found.

As the above description is obviously non-restrictive, the practical realizations may need some variations in order to reach a further increase of performance of the electric motor of the present invention and of its rotation linearity.

What is claimed is:
1. A brushless electric motor, comprising
   (a) a rotor keyed for rotation on a shaft and including a plurality of magnetic poles arranged circumferentially about said shaft and having alternating polarities to define a plurality of magnetic inputs;
   (b) a cylindrical stator surrounding said rotor and containing a plurality of slots, said slots being angularly spaced equidistant about the inner surface of said stator facing said rotor poles;
   (c) a plurality of windings arranged within selected ones of said slots, said windings each being associated with an on-off switch;
   (d) electrical control means connected with said rotor for producing synchronization pulses in accordance with rotation of said rotor and for comparing said synchronization pulses with a reference to produce a control signal which controls the switching of said windings, thereby to control the rotation of said rotor such that each of said windings is successively switched "on" over an operating angle substantially equal to 360° divided by half the number of poles, further divided by the number of windings.
2. Apparatus as defined in claim 1, wherein said rotor includes at least four poles.
3. Apparatus as defined in claim 2, wherein said rotor comprises permanent magnets or electromagnets.
4. Apparatus as defined in claim 1, wherein each switched winding functions as a channel, and further wherein said control means is operable to switch off at least one of said winding channels after start-up of the motor, thereby to conserve electricity.
5. Apparatus as defined in claim 4, wherein said control means may surpass the 360° angle when a given number of winding channels is reached.

* * * * *

UNITED STATES PATENT AND TRADEMARK OFFICE
CERTIFICATE OF CORRECTION

PATENT NO. : 5,128,572
DATED : July 7, 1992
INVENTOR(S) : Fausto GUASTADINI

It is certified that error appears in the above—identified patent and that said Letters Patent is hereby corrected as shown below:

On the title page, in the caption of the patent, Item 19, change the inventor's name from "Fausto" to --Guastadini--.

On the title page, in Item 75, change the inventor's name from "Guastadini Fausto" to --Fausto Guastadini--.

Signed and Sealed this

Tenth Day of August, 1993

Attest:

MICHAEL K. KIRK

Attesting Officer     Acting Commissioner of Patents and Trademarks